(12) United States Patent
Lipp et al.

(10) Patent No.: US 12,509,781 B2
(45) Date of Patent: *Dec. 30, 2025

(54) INTEGRATED LITHIUM PRODUCTION PROCESS

(71) Applicant: Tenova Advanced Technologies Ltd., Yokneam (IL)

(72) Inventors: Jonathan Lipp, Givat Avni (IL); Nadav Dobrin, Kefar Yona (IL)

(73) Assignee: TENOVA ADVANCED TECHNOLOGIES LTD., Yokneam (IL)

( * ) Notice: Subject to any disclaimer, the term of this patent is extended or adjusted under 35 U.S.C. 154(b) by 721 days.

This patent is subject to a terminal disclaimer.

(21) Appl. No.: 17/199,463

(22) Filed: Mar. 12, 2021

(65) Prior Publication Data

US 2021/0198793 A1    Jul. 1, 2021

Related U.S. Application Data

(63) Continuation of application No. 16/073,795, filed as application No. PCT/IB2017/005064 on Feb. 7, 2017, now Pat. No. 10,975,478.

(30) Foreign Application Priority Data

Feb. 8, 2016  (GB) .................................. 1602259

(51) Int. Cl.
| | |
|---|---|
| C25B 1/16 | (2006.01) |
| C22B 3/26 | (2006.01) |
| C22B 3/32 | (2006.01) |
| C22B 26/12 | (2006.01) |
| C25B 1/50 | (2021.01) |
| C25B 9/19 | (2021.01) |
| C25B 15/08 | (2006.01) |

(52) U.S. Cl.
CPC .................. *C25B 1/16* (2013.01); *C22B 3/26* (2021.05); *C22B 3/32* (2021.05); *C22B 26/12* (2013.01); *C25B 1/50* (2021.01); *C25B 9/19* (2021.01); *C25B 15/08* (2013.01); *Y02P 10/20* (2015.11)

(58) Field of Classification Search
CPC ........ C25B 1/16; C22B 3/26–41; C22B 26/12
USPC ........................................................ 205/510
See application file for complete search history.

(56) References Cited

U.S. PATENT DOCUMENTS

| | | | | |
|---|---|---|---|---|
| 9,034,294 | B1 * | 5/2015 | Harrison ................. | C01D 9/04 423/421 |
| 10,975,478 | B2 * | 4/2021 | Lipp ........................ | C25B 9/19 |
| 2011/0044882 | A1 * | 2/2011 | Buckley ................. | C01D 15/02 423/481 |
| 2014/0322110 | A1 * | 10/2014 | Lipp ........................ | C22B 3/26 423/179.5 |

(Continued)

OTHER PUBLICATIONS

Ryabtsev et al., "Preparation of High-Purity Lithium Hydroxide Monohydrate from Technical-Grade Lithium Carbonate by Membrane Electrolysis," Russian Journal of Applied Chemistry, vol. 77, No. 7, 2004, pp. 1108-1116 (Year: 2004).*

*Primary Examiner* — Luan V Van
*Assistant Examiner* — Alexander R. Parent
(74) *Attorney, Agent, or Firm* — Momentum IP; Marc Van Dyke

(57) ABSTRACT

A lithium hydroxide production process integrating a lithium stripping stage with a lithium hydroxide production process performed in a two-compartment electrolysis cell.

8 Claims, 2 Drawing Sheets

(56) References Cited

U.S. PATENT DOCUMENTS

| | | | |
|---|---|---|---|
| 2014/0377154 A1* | 12/2014 | Ishida | C22B 7/007 |
| | | | 423/179.5 |
| 2016/0032471 A1* | 2/2016 | Magnan | C25B 13/02 |
| | | | 205/510 |
| 2017/0022617 A1* | 1/2017 | Magnan | C22B 3/20 |

* cited by examiner

INTEGRATED LITHIUM PRODUCTION PROCESS

FIELD AND BACKGROUND OF THE INVENTION

The present invention relates to processes for producing lithium or lithium salts, and, more particularly, to processes for producing lithium or lithium salts from solutions containing lithium cations.

Electrolysis cell processes as well as bipolar membrane electrodialysis processes for converting lithium salts into lithium hydroxide are known. In the case of lithium chloride, a two-compartment cell may be used. Chlorine is produced at the anode of the two-compartment cell, while the lithium cations migrate across a cation exchange membrane to produce lithium hydroxide in the negatively charged solution ("catholyte") surrounding the cathode. Thus, chlorine is a necessary, and often unwanted, by-product of this process.

A three-compartment electrolysis cell, or a three-compartment bipolar electrodialysis cell, may be used to produce lithium hydroxide. The by-product—hydrochloric acid—may disadvantageously be produced at relatively low concentrations.

In a somewhat analogous three-compartment arrangement, and as schematically depicted in FIG. 1A, lithium sulfate feed may be converted to lithium hydroxide in a dilute aqueous medium. The dilute lithium hydroxide is produced in the catholyte; dilute sulfuric acid by-product is produced in the anolyte compartment, and unconverted lithium sulfate is removed from the center compartment. In the cathode section, the removal of $H_2$ gas causes an imbalance (deficiency) in cations with respect to anions. This facilitates the penetration of $Li^+$ through the cationic membrane C, where a solution containing LiOH is formed. Similarly, in the anodic section, the production and liberation of oxygen gas ($O_2$) causes a deficiency in anions with respect to cations. This facilitates the penetration of $SO_4^{-2}$ through the anionic membrane A, to produce a solution of $H_2SO_4$.

FIG. 1B provides a schematic flow diagram showing how lithium hydroxide might be produced in a two-compartment cell. The two-compartment process, in which—unlike the three-compartment process—the lithium sulfate directly contacts the anode, may characteristically display poor process efficiency. Unlike the chlor-alkali process, in which the anodic reaction produces chlorine, the anodic reaction in lithium sulfate produces oxygen from the aqueous medium, which generates protons. The generated protons reduce the pH of the lithium sulfate solution. Perhaps more significantly, since the protons have appreciably improved mobility with respect to the larger, hindered lithium cations, the protons successfully compete with the lithium cations for transport across the cathodic membrane C. This may appreciably decrease the process efficiency.

The present inventors have recognized a need for improved methods and systems for producing lithium and lithium salts from various lithium-cation containing solutions.

SUMMARY OF THE INVENTION

According to teachings of the present invention there is provided a method of producing an aqueous lithium-containing solution from a lithium-loaded medium, the method including: (a) providing a two-compartment electrolysis cell having an anode, a cathode, and a membrane barrier disposed therebetween, the membrane barrier being permeable to lithium ($Li^+$) cations and to protons ($H^+$); (b) stripping the lithium-loaded medium by means of an aqueous stripping solution, to extract the lithium cations from the medium into the aqueous stripping solution, producing an aqueous, lithium-containing intermediate solution along with a stripped medium; (c) introducing the aqueous, lithium-containing intermediate solution into an anodic compartment of the two-compartment electrolysis cell, to form an anolyte; (d) introducing an aqueous medium such as water into a cathodic compartment of the two-compartment electrolysis cell to form a catholyte; (e) operating the cell so as to: (i) generate oxygen gas at the anode; (ii) produce the protons ($H^+$) within the anolyte; and (iii) generate hydrogen gas and hydroxide ($OH^-$) at the cathode; and such that a portion of the lithium cations and a portion of the protons traverse the membrane barrier, whereby the protons react with the hydroxide to produce water in the catholyte; (f) removing an aqueous product stream from the cathodic compartment, the product stream containing dissolved lithium hydroxide values; and (g) recycling a discharge stream containing the anolyte, from the anodic compartment, for use in the stripping of the lithium-loaded medium.

According to further features in the described preferred embodiments, the lithium cation is the predominant cation in the lithium-containing aqueous intermediate solution.

According to still further features in the described preferred embodiments, the lithium-containing aqueous intermediate solution contains, by weight, at most 1%, at most 0.5%, at most 0.2%, or at most 0.05% chloride, or is substantially devoid of chloride.

According to still further features in the described preferred embodiments, the predominant anion in the aqueous, lithium-containing intermediate solution has a higher reduction potential than water.

According to still further features in the described preferred embodiments, the predominant anion is sulfate.

According to still further features in the described preferred embodiments, the predominant anion is nitrate.

According to still further features in the described preferred embodiments, the predominant anion is perchlorate.

According to still further features in the described preferred embodiments, the predominant anion is dihydrogen phosphate.

According to still further features in the described preferred embodiments, the concentration of the dissolved lithium hydroxide values in the product stream is within a range of 0.1 to 6M, 0.1 to 5M, 0.1 to 4.5M, 0.2 to 4.5M, 0.5 to 4.5M, 1 to 4.5M, 1.5 to 4.5M, or 1 to 4.5M.

According to still further features in the described preferred embodiments, the concentration of the dissolved lithium hydroxide values in the product stream is at most 6M, at most 5M, or at most 4M.

According to still further features in the described preferred embodiments, the concentration of the dissolved lithium hydroxide values in the product stream is at least 0.1M, at least 0.2M, at least 0.4M, at least 0.7M, or at least 1M.

According to still further features in the described preferred embodiments, the anolyte contains the lithium cations and the protons ($H^+$) in a molar ratio within a range of 100:1 to 1:10 of $Li^+$ to $H^+$.

According to still further features in the described preferred embodiments, the molar ratio of $Li^+$ to $H^+$ is at least 1:5, at least 1:4, at least 1:3, at least 1:2, at least 1:1.5, or at least 1:1.

According to still further features in the described preferred embodiments, the molar ratio of Li⁺ to H⁺ is at most 75:1, at most 50:1, at most 40:1, at most 30:1, at most 20:1, at most 15:1, or at most 10:1.

According to still further features in the described preferred embodiments, the concentration of the dissolved lithium hydroxide values in the aqueous product stream is at least 0.1M, at least 0.25M, at least 0.4M, at least 0.7M, at least 1M, or at least 1.5M.

According to still further features in the described preferred embodiments, the concentration of the dissolved lithium hydroxide values is at most 6M, at most 5M, at most 4.5M, or at most 4M.

According to still further features in the described preferred embodiments, the lithium conversion of the lithium cations is defined as a ratio of an amount of the lithium cations in the aqueous product stream to a total amount of the lithium cations introduced to the two-compartment electrolysis cell (e.g., for a batch process), and the lithium conversion being at most 75%, at most 60%, at most 50%, at most 45%, at most 40%, at most 35%, at most 30%, or at most 25%, and wherein, for a continuous process, the ratio of an amount of the lithium cations in the aqueous product stream to the total amount of the lithium cations introduced to the two-compartment electrolysis cell is evaluated during continuous, steady-state operation.

According to still further features in the described preferred embodiments, the lithium conversion is at least 0.5%, at least 1%, at least 2%, at least 3%, at least 5%, at least 7%, at least 10%, at least 15%, or at least 10%, at least 20%.

According to still further features in the described preferred embodiments, the lithium conversion is at most 20%, at most 15%, at most 10%, at most 7%, at most 5%, at most 3%, at most 2%, or at most 1%.

According to still further features in the described preferred embodiments, the ratio of an amount of the lithium cations in the discharge stream to an amount of the lithium cations in the lithium-containing intermediate solution (e.g., for a batch process), is defined as $R_{anolyte}$, the lithium conversion ($C_{Li}$) of the lithium cations is defined as:

$$C_{Li} = 1 - R_{anolyte}$$

wherein $C_{Li}$ is at most 75%, at most 60%, at most 50%, at most 45%, at most 40%, at most 35%, at most 30%, or at most 25%, and wherein, for a continuous process, the ratio of an amount of the lithium cations in the discharge stream to the amount of the lithium cations in the lithium-containing intermediate solution is evaluated during continuous, steady-state operation.

According to still further features in the described preferred embodiments, $C_{Li}$ is at least 0.5%, at least 1%, at least 2%, at least 3%, at least 5%, at least 7%, at least 10%, at least 15%, or at least 10%, at least 20%.

According to still further features in the described preferred embodiments, $C_{Li}$ is at most 20%, at most 15%, at most 10%, at most 7%, at most 5%, at most 3%, at most 2%, or at most 1%.

According to still further features in the described preferred embodiments, the method is devoid of a three-compartment electrolysis process.

According to still further features in the described preferred embodiments, the operating temperature within the two-compartment electrolysis cell is within a range of 20° C. to 95° C.

According to still further features in the described preferred embodiments, this operating temperature is at least 30° C., at least 40° C., at least 45° C., at least 50° C., or at least 55° C.

According to still further features in the described preferred embodiments, this operating temperature is at most 90° C., at most 87° C., or at most 85° C.

According to still further features in the described preferred embodiments, the lithium-loaded medium is a lithium-loaded organic medium, and the stripped medium is a stripped organic medium.

According to still further features in the described preferred embodiments, the lithium-loaded organic medium includes at least one organic species of the form R⁻—Li⁺, wherein R⁻ is an organic proton acceptor or wherein R is an organic proton donor.

According to still further features in the described preferred embodiments, R includes, mainly includes, consists essentially of, or consists of an alcohol.

According to still further features in the described preferred embodiments, the alcohol includes at least one alcohol selected from the group consisting of a straight-chain alcohol, a branched alcohol, and a diol or polyol.

According to still further features in the described preferred embodiments, the alcohol includes at least one $C_1$-$C_{10}$ alcohol.

According to still further features in the described preferred embodiments, R includes, mainly includes, consists essentially of, or consists of a ketone.

According to still further features in the described preferred embodiments, the ketone includes at least one ketone selected from the group consisting of a straight-chain ketone, a branched ketone, and a diketone or a polyketone.

According to still further features in the described preferred embodiments, the ketone includes at least one $C_3$-$C_{10}$ ketone.

According to still further features in the described preferred embodiments, R includes, mainly includes, consists essentially of, or consists of an aldehyde.

According to still further features in the described preferred embodiments, the aldehyde includes at least one aldehyde selected from the group consisting of a straight-chain aldehyde, a branched aldehyde, and a dialdehyde or polyaldehyde.

According to still further features in the described preferred embodiments, the aldehyde includes at least one $C_1$-$C_{10}$ aldehyde.

According to still further features in the described preferred embodiments, R includes, mainly includes, consists essentially of, or consists of a carboxylic acid.

According to still further features in the described preferred embodiments, the carboxylic acid includes at least one carboxylic acid selected from the group consisting of a straight-chain carboxylic acid, a branched carboxylic acid, an aryl carboxylic acid, and a dicarboxylic acid or polycarboxylic acid.

According to still further features in the described preferred embodiments, the carboxylic acid includes at least one $C_1$-$C_{20}$ carboxylic acid.

According to still further features in the described preferred embodiments, the carboxylic acid is a fatty acid.

According to still further features in the described preferred embodiments, the carboxylic acid is selected from the group consisting of a saturated carboxylic acid, a monounsaturated carboxylic acid, and a polyunsaturated carboxylic acid.

According to still further features in the described preferred embodiments, the method further includes mixing an aqueous feed solution with an extracting organic solution to produce the lithium-loaded organic medium.

According to still further features in the described preferred embodiments, $R^-$ is a functional group of a cationic ion-exchange resin.

According to still further features in the described preferred embodiments, the lithium-loaded organic medium is a lithium-loaded organic solution.

According to still further features in the described preferred embodiments, the method further includes separating, in a separation vessel, the lithium-containing aqueous intermediate solution from the stripped organic medium.

According to still further features in the described preferred embodiments, the stripped organic medium is a stripped organic solution.

According to still further features in the described preferred embodiments, the lithium-loaded medium includes an inorganic lithium-loaded medium.

According to still further features in the described preferred embodiments, the inorganic lithium-loaded medium includes at least one inorganic adsorbent.

According to still further features in the described preferred embodiments, the inorganic adsorbent includes a metal oxide.

According to still further features in the described preferred embodiments, the metal oxide includes a manganese oxide.

According to still further features in the described preferred embodiments, the membrane barrier includes a cation exchange membrane.

According to still further features in the described preferred embodiments, the membrane cation exchange membrane is a perfluorinated cation exchange membrane.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1A:
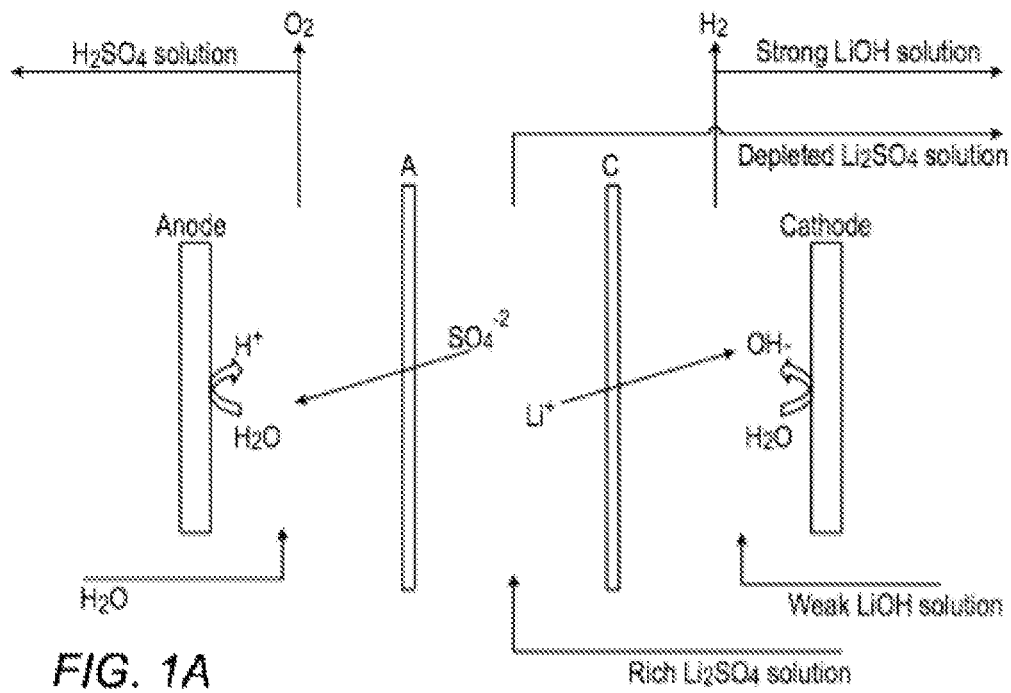
FIG. 1A is a schematic flow diagram of a prior art lithium hydroxide production process performed in a three-compartment electrolysis cell.
Figure 1B:
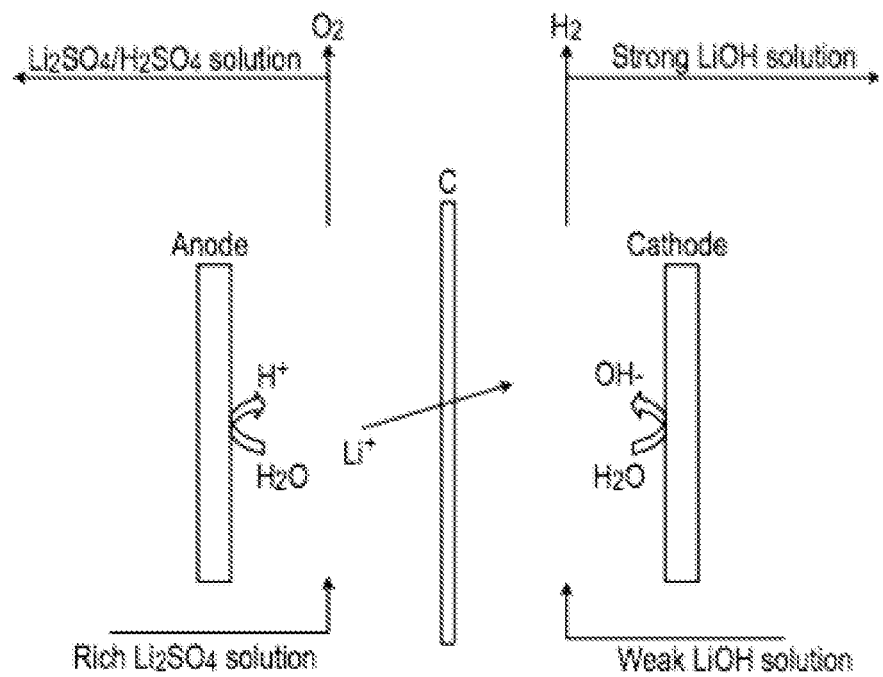
FIG. 1B is a schematic flow diagram of a lithium hydroxide production process performed in a two-compartment electrolysis cell.

The principles and operation of the processes according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The inventors have discovered that two-compartment electrolysis, though techno-economically unfeasible as a separate process, may be symbiotically integrated with a lithium cation extraction and stripping train, with a mixed $Li^+/H^+$ electrolysis effluent stream being recycled to the extraction and stripping train. Moreover, the inventors have further discovered that the ratio of the $Li^+/H^+$ in this electrolysis effluent stream may be controlled within a particular range (e.g., 10:1 to 1:2, on a molar basis), a ratio that may reflect a poor or extremely poor conversion for a two-compartment cell operating in a conventional manner. However, in the inventive, integrated conversion, such poor conversion greatly improves efficiency in the electrolysis stage, without negatively impacting the lithium cation extraction and stripping train. The undesirable penetration of $H^+$ through the cationic membrane and subsequent conversion with $OH^-$ to form water is appreciably reduced with respect to the conventional process. The remaining acidic solution may be returned to the solvent extraction train, where the electrochemically produced proton will be utilized and substituted by lithium.

A successful approach to extraction and stripping lithium cations from an aqueous feed solution is provided in PCT Patent Application No. PCT/IL2012/050435, which is incorporated by reference for all purposes as if fully set forth herein.

The method of removing lithium ions from an aqueous feed solution may advantageously be continuous, and typically includes the following steps:

(a) mixing the aqueous feed solution with an extracting organic solution containing an organic diluent, at least one phosphine oxide and at least one proton donating agent (e.g., an organic acid) under basic conditions, so as to extract the lithium ions into the organic solution, producing a lithium-loaded organic solution;

(b) stripping the lithium-loaded organic solution by means of an aqueous stripping solution, so as to remove lithium ions from the organic solution and load the lithium ions into the aqueous stripping solution, producing the lithium-containing aqueous product solution, as well as a stripped (or "spent") organic solution;

Other extracting technologies are known in the art, such as ion exchange (IX). These include the use of organic ion-exchange resins, typically cationic resins having an organic backbone. Various inorganic ion-exchange technologies are known, for example, adsorptive ion-exchange processes disclosed by Garrett ("Handbook of Lithium and Natural Calcium Chloride", Elsevier Academic Press 2004, pp. 144-145):

Pan et al. (2002) have presented a general review of various methods to recover lithium from brines, and Sprinskiy (2000) made a similar review of methods to recover lithium from Carpathian groundwater. Many other adsorbents for lithium have also been suggested, such as spinel or cryptomelane-type $MnO_2$, or antimonates of $Sn^{+4}$ or $Ti^{+4}$. Abe et al. (1993) recovered lithium from seawater (at 0.17 ppm Li) with a number of metal oxide adsorbents, and found that granules of $\lambda$ or $(\lambda+\gamma)MnO_2.0.18H_2O$, $3.1TiO_2$—$Sb_2O_5.4.9H_2O$ and $1.1SnO_2$—$Sb_2O_5.4.9H_2O$ could all recover up to 99% of the lithium when seawater was slowly passed through packed beds of the oxides. The adsorption preference for the manganese dioxide and tin antimonate was in the sequence of Li>Cs>Rb>K>Na, while with the titanium Cs was preferred over Li. This allowed lithium separations from sodium of $10^4$-$10^5$ fold, Li from K of about 1/10th that amount, and separations from Mg and Ca only about 10-fold or less. The maximum amount of lithium adsorbed was about 0.003 g Li/g of oxides, and when eluted from the column with 1-5 M $HNO_3$ the best separation was with $\lambda MnO_2$ and a 63% recovery. The peak strength of this eluate (as ppm) was about 6 Li, 4 K and Ca, and 2.4 Na and Mg, with the average eluate being about half that value. No testing was done on the re-use or re-generation of the adsorbents, or of re-treating the eluate.

A subsequent series of reports were made on similar studies with different adsorbents, perhaps culminating with the selection of $H_{1.6}Mn_{1.6}O_4$ as the preferred adsorbent. It was prepared by heating $LiMnO_2$ to 400° C. to form $Li_{1.6}Mn_{1.6}O_4$, and then reacting it with 0.5 M HCl. In column tests this material was capable of loading from 34 to 40 mg of Li/g of adsorbent from seawater, along with 4.1-6.6 Na, 0.5-1.4 K, 2.3-2.5 Mg and 2.9-4.0 Ca mg/g. The cations could be almost totally removed (eluted) by 0.5 M HCl (along with 2.5-3.5% of the Mn), and in a second adsorption cycle the recovery and loading were almost the same. The recovery efficiency from the seawater was about 60% (Chitrakar et al., 2001). Umeno et al. (2002) later added the same manganese oxide adsorbent to a polyvinyl chloride polymer to prepare an adsorbent film. Using a specially designed membrane-seawater contact box the loading was 10.6 mg/g of membrane for lithium, along with 4.3 Na, 0.4 K, 10.8 Mg, 5.3 Ca and 0.5 Sr as mg/g. It was speculated that the manganese oxide was in the form of an ion sieve with a predominant pore size small enough for lithium, but not sodium, potassium or calcium. The magnesium, with about the same ionic radius has a much higher energy of hydration, and thus needs more energy to become dehydrated and enter the pore space. The larger particle size of the manganese oxide granules in the packed bed accentuated this effect, and thus rejected more magnesium. Other adsorbents that have been suggested include $Li_2Cr(PO_4)_{1.67}$, which was claimed to react similarly to lithium-alumina, have a capacity of 9.3 mg/g in seawater, and have a concentration factor of 3.3× $10^4$. It was most effective above a pH of 6.2, but could be used down to a pH of 3 (Miyai et al., 2001). Activated carbon impregnated with sodium oleate has also been suggested for seawater, along with many types of equipment to facilitate the lithium ad sorption.

The aqueous stripping solution may be a strong mineral acid, and the lithium-containing aqueous product solution may thus include the lithium derivative of that stripping acid. This product solution, which may be appreciably enriched in lithium content (expressed in mole % of cations), is typically processed downstream.

The lithium-loaded organic solution may be purified (e.g., "scrubbed") in a purifying step so as to produce a purified lithium-loaded organic solution for feeding into step (b). The spent scrub solution may be returned to step (a).

Figure 2:
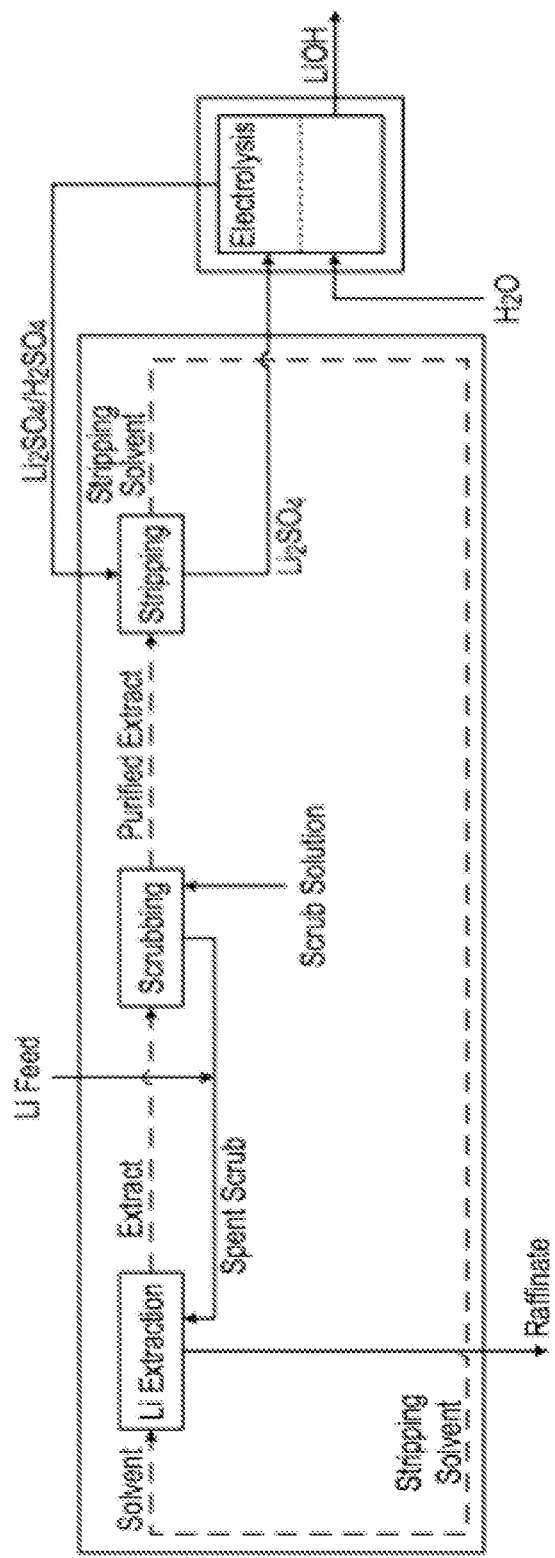
FIG. 2 is a schematic flow diagram of a lithium hydroxide production process integrating a lithium extraction and stripping train with a lithium hydroxide production process performed in a two-compartment electrolysis cell, according to teachings of the present invention.

Referring now to FIG. 2, FIG. 2 is a schematic flow diagram of a lithium hydroxide production process integrating a lithium extraction and stripping train with a lithium hydroxide production process performed in a two-compartment electrolysis cell, according to teachings of the present invention. In the lithium extraction and stripping train, the aqueous feed solution or feed source is subjected to extraction by contacting the aqueous feed solution with an extracting organic solution to produce a lithium-loaded organic solution. The lithium-loaded organic solution is then stripped by means of an aqueous stripping solution (in the exemplary embodiment of FIG. 2: a sulfuric acid containing stripping solution), to extract lithium ions from the organic solution into the aqueous stripping solution, producing a lithium-containing aqueous intermediate solution along with a stripped organic solution. The stripped organic solution is returned to an earlier stage of the process, typically to the extraction stage. The lithium-containing aqueous intermediate solution is then introduced into an anodic compartment of said two-compartment electrolysis cell, to form an anolyte. In parallel, an aqueous medium is introduced into the cathodic compartment of the two-compartment electrolysis cell to form a catholyte.

The two-compartment cell is operated so as to generate oxygen gas at the anode, producing protons ($H^+$) within the anolyte; and so as to generate hydrogen gas and hydroxide ($OH^-$) at the cathode. Unlike the three-compartment cell, the two-compartment cell is devoid of an anionic membrane. Rather, the two-compartment cell has, solely, a cationic membrane C disposed between the anodic compartment and the cathodic compartment, and adapted to enable lithium ions to traverse the membrane and pass into the catholyte.

Disadvantageously, protons compete with the lithium cations in traversal of the cationic membrane. The protons then combine with the hydroxide ions available in the catholyte, producing water. This side-reaction reduces the current efficiency (i.e., the molar ratio of lithium cation in the catholyte to hydroxide atoms produced) of the process.

The catholyte, containing Li+ and $OH^-$ values, is removed, typically in continuous fashion, as a product stream from the cathodic compartment. The anolyte from the anodic compartment is recycled to the extraction/stripping train, typically to the stripping stage.

The lithium-rich aqueous solution produced in the stripping stage is introduced to the anodic side and directly contacts the anode. The removal of oxygen at the anode forms $H^+$ ions, thereby increasing the acidity of the anolyte. In the exemplary case in which the main anion in the lithium-rich aqueous solution is sulfate, the anolyte solution contains an increased $H_2SO_4$ concentration (i.e., increased concentrations of $H^+$ and $SO_4^{-2}$) with respect to the lithium-rich aqueous solution produced in the stripping stage.

The lithium-loaded organic solution or medium may include at least one organic species of the form $R^-$—$Li^+$, wherein $R^-$ is an organic proton acceptor or wherein R is an organic proton donor. R may include, mainly include, consists essentially of, or consist of an alcohol, a ketone, an aldehyde, a carboxylic acid, or other organic materials that may be recognized or found to be suitable by those of ordinary skill in the art. Specific examples include isoamyl alcohol, glycerol, methyl-isobutyl ketone (MIBK), thenoyl trifluoroacetone, and benzoyl acetone.

It will be further appreciated by those of ordinary skill in the art that various substitutions may be made in the various species ($R^-$) that associate with the lithium ion, such that R or $R^-$ may include atoms or ligands other than C, H, and O. For example, substitutions, or in some cases, multiply-substitutions may be made in R or by atoms or ligands such as Cl, Br, I, N, P and S. Typically, Cl, Br, and I may replace hydrogen. N, P and S may be disposed in the backbone or may be attached to the backbone, for example, as part of a branch.

To facilitate the efficient production of lithium hydroxide, the cation membrane must limit or ideally—substantially inhibit—back migration of hydroxide. The cation membrane may be constructed, or selected from various commercially available cation membranes, having varying degrees of efficacy. While the efficacy clearly depends on the properties of the membrane, various process parameters, including the concentration of hydroxide, may appreciably affect the amount of back migration. For example, in a cell having a high concentration of hydroxide on one side (e.g., in the catholyte) of a membrane, and a low concentration of hydroxide on the other side, a driving force exists for equalizing the concentrations.

Bilayer membranes formulated to prevent hydroxide transport across the membrane may be of particular suitability. One example of such a commercially available cation membrane is Nafion 324 (Dupont). If the amount of divalent cations (calcium/magnesium) present in the feed solution to the two-compartment cell is fairly low, the Nafion 900 series membranes may also be suitable. To this end, the lithium-containing aqueous product solution produced in the stripping stage may, in some embodiments, be subjected to ion exchange to sufficiently reduce the divalent cation concentration. Non-fluorinated membranes such as FuMA-Tech FKB/FKL may also be utilized.

As used herein in the specification and in the claims section that follows, the term "predominant cation", with respect to a solution, refers to a cation having the highest normal concentration within that solution.

As used herein in the specification and in the claims section that follows, the term "predominant anion", with respect to a solution, refers to an anion having the highest normal concentration within that solution. Predominant anions may include sulfate, nitrate, perchlorate, and dihydrogen phosphate.

As used herein in the specification and in the claims section that follows, the term "$R^-$", with respect to a species "R" having a functional group, refers to a moiety identical to "R", but with one less hydrogen atom at the site of that functional group. Thus, for example, when R is butyric acid ($H_3C$—$CH_2$—$CH_2$—COOH), also represented as

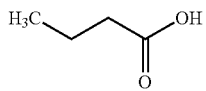

then $R^-$ would be represented by $H_3C$—$CH_2$—$CH_2$—$COO^-$.

PCT/IB2017/050644 filed on Feb. 7, 2017 is herein incorporated by reference in its entirety.

As used herein in the specification and in the claims section that follows, the term "percent", or "%", refers to mole-percent, unless specifically indicated otherwise.

Similarly, the term "ratio", as used herein in the specification and in the claims section that follows, refers to a molar ratio, unless specifically indicated otherwise.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including PCT Patent Publication No. WO/2013/065050, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of producing an aqueous lithium-containing solution from a lithium-loaded organic medium, the method comprising:
   (a) providing a two-compartment electrolysis cell having an anode, a cathode, and a membrane barrier disposed therebetween, said membrane barrier being permeable to lithium ($Li^+$) cations and to protons ($H^+$);
   (b) stripping the lithium-loaded organic medium by means of an aqueous stripping solution, to extract said lithium cations from the lithium-loaded organic medium into the aqueous stripping solution, producing an aqueous, lithium-containing intermediate solution along with a stripped organic medium;
   (c) introducing said aqueous, lithium-containing intermediate solution into an anodic compartment of said two-compartment electrolysis cell, to form an anolyte;
   (d) introducing an aqueous medium into a cathodic compartment of said two-compartment electrolysis cell to form a catholyte;
   (e) operating said cell so as to:
      (i) generate oxygen gas at said anode;
      (ii) produce said protons ($H^+$) within said anolyte; and
      (iii) generate hydrogen gas and hydroxide ($OH^-$) at said cathode;
   and such that a portion of said lithium cations and a portion of said protons traverse said membrane barrier, whereby said protons react with said hydroxide to produce water in said catholyte;
   (f) removing an aqueous product stream from said cathodic compartment, said product stream containing dissolved lithium hydroxide values; and
   (g) recycling a discharge stream containing said anolyte, from said anodic compartment, for use in said stripping of the lithium-loaded organic medium;
the method further comprising:
   (h) between steps (b) and (c), separating said lithium-containing aqueous intermediate solution from said stripped organic medium;
   (i) returning said stripped organic medium to an extraction stage; and (j) mixing an aqueous lithium-containing feed solution with said stripped organic medium, in said extraction stage, to produce said lithium-loaded organic medium; wherein said discharge stream contains said lithium cations and said protons ($H^+$) in a molar ratio within a range of 100:1 to 1:1 of $Li^+$ to $H^+$.

2. The method of claim 1, wherein the method is a continuous method.

3. A method of producing an aqueous lithium-containing solution from a lithium-loaded organic medium, the method comprising:
(a) providing a two-compartment electrolysis cell having an anode, a cathode, and a membrane barrier disposed therebetween, said membrane barrier being permeable to lithium ($Li^+$) cations and to protons ($H^+$);
(b) stripping the lithium-loaded organic medium by means of an aqueous stripping solution, to extract said lithium cations from the lithium-loaded organic medium into the aqueous stripping solution, producing an aqueous, lithium-containing intermediate solution along with a stripped organic medium;
(c) introducing said aqueous, lithium-containing intermediate solution into an anodic compartment of said two-compartment electrolysis cell, to form an anolyte;
(d) introducing an aqueous medium into a cathodic compartment of said two-compartment electrolysis cell to form a catholyte;
(e) operating said cell so as to:
(i) generate oxygen gas at said anode;
(ii) produce said protons ($H^+$) within said anolyte; and
(iii) generate hydrogen gas and hydroxide ($OH^-$) at said cathode;
and such that a portion of said lithium cations and a portion of said protons traverse said membrane barrier, whereby said protons react with said hydroxide to produce water in said catholyte;
(f) removing an aqueous product stream from said cathodic compartment, said product stream containing dissolved lithium hydroxide values; and
(g) recycling a discharge stream containing said anolyte, from said anodic compartment, for use in said stripping of the lithium-loaded organic medium;
the method further comprising:
(h) between steps (b) and (c), separating said lithium-containing aqueous intermediate solution from said stripped organic medium;
(i) returning said stripped organic medium to an extraction stage; and
(j) mixing an aqueous lithium-containing feed solution with said stripped organic medium, in said extraction stage, to produce said lithium-loaded organic medium;
wherein, within said lithium-containing intermediate solution, said lithium cations are a predominant cation;
wherein, within said lithium-containing intermediate solution, sulfate anions are a predominant anion; and
wherein said discharge stream contains said lithium cations ($Li^+$) and said protons ($H^+$) in a molar ratio within a range of 40:1 to 1:2.

4. The method of claim 3, wherein the method is a continuous method.

5. The method of claim 3, wherein said molar ratio is within a range of 10:1 to 1:2.

6. The method of claim 5, wherein the method is a continuous method.

7. The method of claim 5, wherein said molar ratio is at least 1:1.

8. The method of claim 7, wherein the method is a continuous method.

* * * * *